3,223,593
METHOD OF PREPARING IMMOBILIZED SERUM CHOLINESTERASE AND PRODUCT THEREOF
Frank L. Aldrich, Falls Church, Vera R. Usdin, Arlington, and Bruno M. Vasta, Vienna, Va., assignors to Melpar, Inc., Falls Church, Va., a corporation of Delaware
No Drawing. Filed Aug. 14, 1963, Ser. No. 301,953
5 Claims. (Cl. 195—63)

The present invention relates generally to methods of preparing serum cholinesterase in an inexpensive, immobilized (water-insoluble) re-usable form, and to the resulting product.

Briefly describing the invention, horse serum cholinesterase is entrapped in a gel, with or without subsequent lyophilization, to yield a usable and re-usable immobilized horse serum cholinesterase. The immobilized cholinesterase is used by percolating a suitable substrate solution through the gel or lyophilized powder by means of suction or pressure. The substrate solution contains acetylthiocholine, sodium dichloroindophenol and pH 7.4 buffer. The entrapped cholinesterase catalyzes the hydrolysis of acetylthiocholine to acetic acid and thiocholine, which in turn reacts with the blue sodium-dichloroindophenol to yield a colorless product.

When a known inhibitor of cholinesterase, such as physostigmine, is added to the substrate solution no reaction takes place and the blue color of the sodium-dichloroindophenol remains unchanged, i.e. the procedure does not yield a colorless product. Physostigmine is a reversible inhibitor. It can be washed out of the gel by water, buffer, or substrate solution, whereupon the immobilized-enzyme preparation regains its activity.

It is an object of the invention to provide a method of preparing horse serum cholinesterase in an immobilized reusable form.

It is another object of the invention to provide a method of preparing a product comprising horse serum cholinesterase entrapped into a gel or a lyophilized powder, ready for use.

Immobilized horse serum cholinesterase is useful in detection devices, since it lowers the quantitative requirement for horse serum cholinesterase by several orders of magnitude, and simplifies the construction of detection devices employing the enzyme. The method can be used in any process in which it is desired to hydrolize specific esters, as acetylcholine, butyrylcholine, or phenylacetate, and to recover the hydrolysis products uncontaminated by enzyme.

Essentially, immobilization of horse serum cholinesterase is achieved by incorporation in gels, such as starches, agars, and carrageenins. The resulting preparation is stable, and enzymatically active. It is capable, when so incorporated, of being inhibited by standard anticholinesterases. The gels can be lyophilized to yield dry powders, in order to minimize storage problems, and these powders have been found to be active.

Example I 3.25 g. of Connaught starch and 25 ml. of distilled water are heated gently until a clear, viscous sol is formed. Six mg. of Worthington horse serum cholinesterase are sprinkled on a glass template. Six ml. of the sol, cooled to 45° C., are then pipetted on top of the enzyme, and mixed gently. A filter paper disc is placed over the partially solidified mix, the template is inverted on a smooth surface and pressed gently to remove air. The template is then placed in a refrigerator to allow complete solidification of the gel. It is now ready for use.

Example II

The product of Example I is lyophilized.

Example III 6 mg. of Worthington horse serum cholinesterase are added to a sol, in powdered or dissolved form, the sol being 3.25 g. of gelling material to 25 ml. of distilled water. Starches, agars, carrageenins, may be utilized as gelling materials. The mix is poured into a flask, which is rotated and cooled until a large film of gel results. This procedure improves lyophilization.

What we claim is:
1. The process of making an enzymatically active gel comprising mixing six mg. of horse serum cholinesterase in 3.25 g. of gelling material and 25 ml. of water, at about 45° C., and solidifying the gel by cooling the gelling material being starch, agar or carrageenin.
2. The process of preparing an enzymatically active immobilized horse serum cholinesterase by incorporation thereof into a starch gel, thereafter lyophilizing the gel to a powder.
3. An enzymatically active powder comprising a lyophilized starch gel containing horse serum cholinesterase.
4. An enzymatically active powder composed of a lyophilized gel of Connaught starch and horse serum cholinesterase.
5. An enzymatically active powder comprising a lyophilized gel containing horse serum cholinesterase, the gelling material being starch, agar or carrageenin.

References Cited by the Examiner
UNITED STATES PATENTS

| | | | |
|---|---|---|---|
| 2,475,793 | 7/1949 | Lesuk | 195—66 |
| 2,908,614 | 10/1959 | Muggleton et al. | 195—68 |
| 3,019,171 | 1/1962 | Bloch et al. | 195—68 |
| 3,049,411 | 8/1962 | Gelman et al. | 195—103.5 X |
| 3,122,420 | 2/1964 | Rebar et al. | 252—408 |

OTHER REFERENCES

Bernsohn et al.: Proceedings of the Society for Experimental Medicine and Biology 108 (1), 71–73 (October 1961).

A. LOUIS MONACELL, Primary Examiner.

L. M. SHAPIRO, Assistant Examiner.